United States Patent [15] 3,690,602
Marsh, deceased [45] Sept. 12, 1972

[54] AUTOMATIC CARGO RELEASE MECHANISM

[72] Inventor: John Marsh, deceased, late of Trumbull, Conn. by Jean S. Marsh, administratrix

[73] Assignee: United Aircraft Corporation

[22] Filed: March 30, 1971

[21] Appl. No.: 129,499

[52] U.S. Cl. ............... 244/137 R, 294/81, 294/83 A
[51] Int. Cl. ............................................. B64d 1/00
[58] Field of Search .294/81, 83 R, 83 A; 244/137 R, 244/2, 17.11

[56] References Cited

UNITED STATES PATENTS 2,838,337   6/1958   Wilhelmsen ............. 294/83 R
3,224,804   12/1965  Campbell ................. 294/83 R
3,503,576   3/1970   Savarieau ................ 244/137 R Primary Examiner—Milton Buchler
Assistant Examiner—Paul E. Sauberer
Attorney—Vernon F. Hauschild

[57] ABSTRACT

Automatic release mechanism for cargo handling equipment in which cargo is supported from a spreader bar, which is in turn connected at its opposite ends to one or more aircraft and which includes cargo release mechanism responsive to spreader bar rotation about the transverse axis at one of its ends to release the cargo hook which is located between the spreader bar and the aircraft.

16 Claims, 3 Drawing Figures

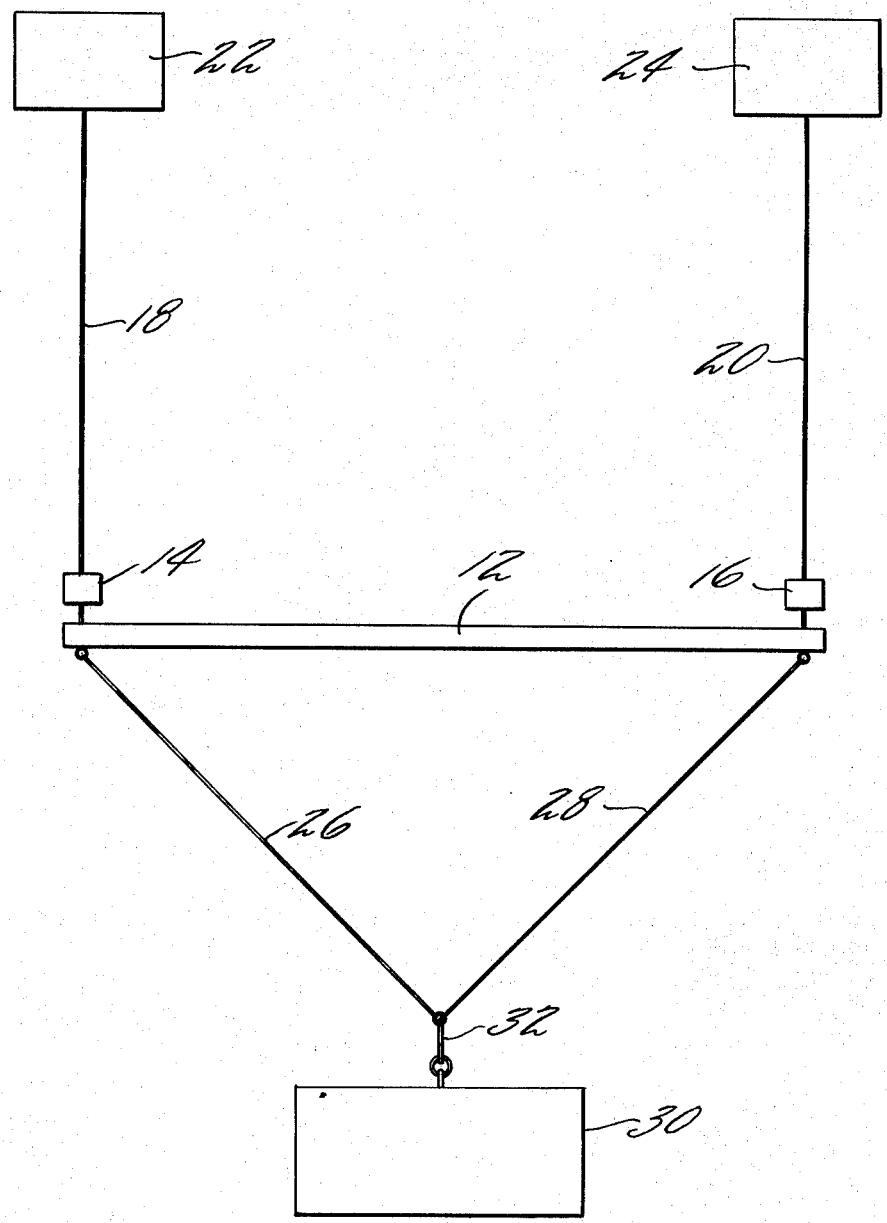

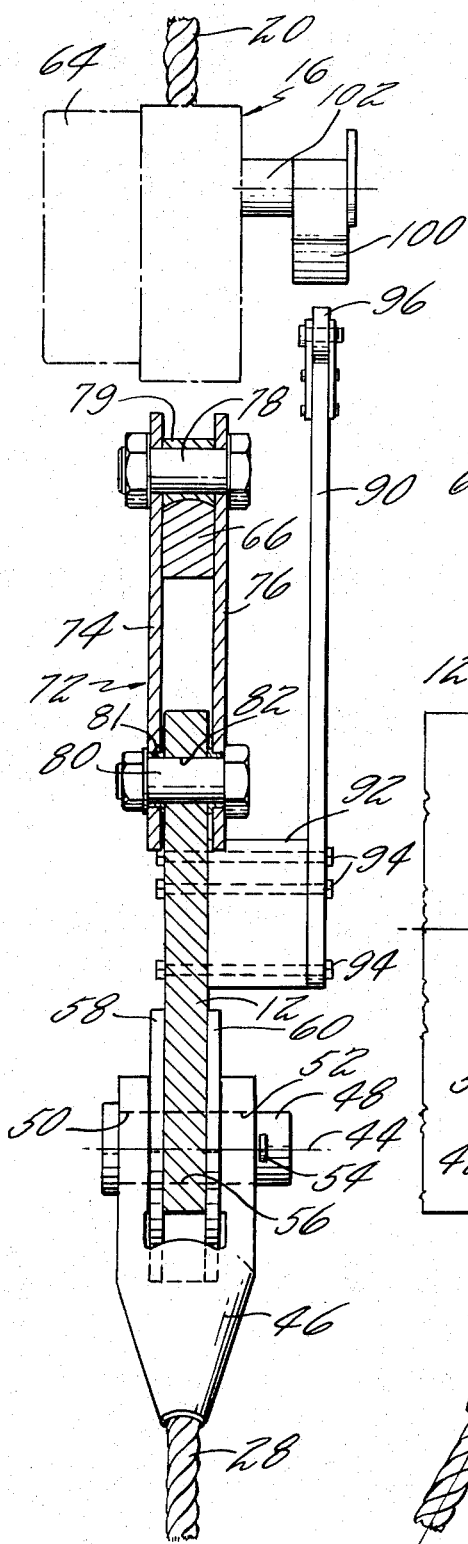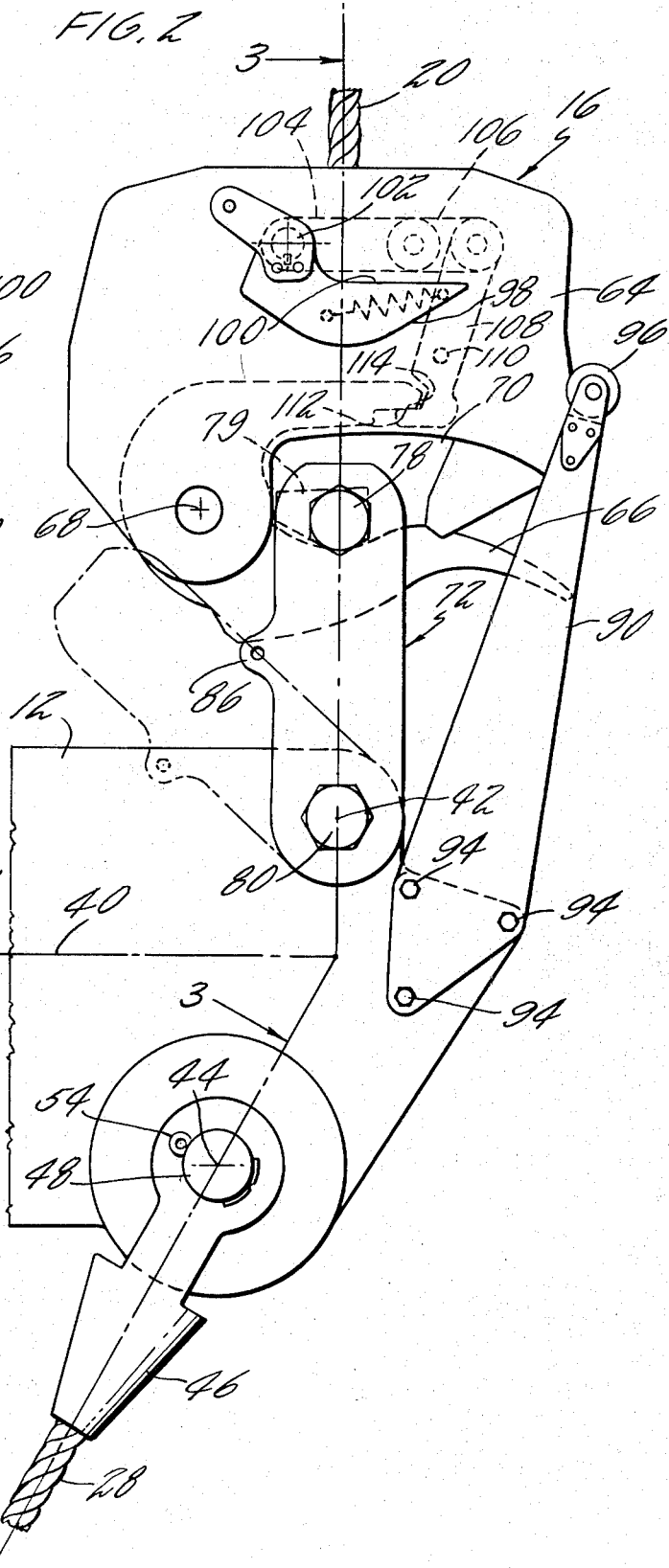

AUTOMATIC CARGO RELEASE MECHANISM

BACKGROUND OF THE INVENTION

1. Field of Invention

This invention relates to cargo automatic release mechanism and more particularly to such release mechanism for cargo handling equipment which comprises a spreader bar connected to the cargo load at its opposite ends and also connected at its opposite ends to one or more aircraft, preferably of the helicopter variety, to insure that the weight of the cargo is not supported solely from one aircraft if support from the other aircraft is discontinued due to failure of the support mechanism connecting the spreader bar to the aircraft, or by inadvertent jettisoning of the cargo by the second aircraft. The cargo is also automatically released if the spreader bar fails, since such failure would result in forces which would tend to draw the supporting aircraft together. Any of these happenings manifest themselves in the spreader bar inclining or rotating about the transverse axis of the attached end. The teaching herein is to provide mechanism to release the attached spreader bar end when the rotation thereof exceeds a predetermined limit. Accordingly, cargo release and jettisoning is accomplished whenever the spreader bar so rotates or tilts beyond a predetermined limit for any reason including hoist cable failure of either aircraft, failure of the conventional hook release mechanism, spreader bar failure, load cable failure, or drastically erratic station keepings between the supporting aircraft.

2. Description of the Prior Art

In the cargo handling art, it is known to suspend a cargo load from a spreader bar which is supported either directly, as in the Young U. S. Pat. No. 2,721,004, or through cables as in Huested U.S. Pat No. 2,730,398, from two helicopters, and to provide a release mechanism for the cargo load. For example, in the Young patent, quick disconnect devices, which are apparently electrically actuated, are positioned between the ends of the spreader bar and the helicopter. It should be noted that in the Young construction, however, that inadvertent actuation of one of these devices attaching one end of the spreader bar to one of the helicopters, failure of the spreader bar, and so forth does not automatically release the load from the second helicopter and hence the second helicopter is thrown into perilous condition from which it may not recover in time for the load to be released therefrom by the conventional means provided. In the Huested patent, manually operated lanyards are provided to release the cargo hooks at opposite ends of the spreader bar but here again, inadvertent release of one of the lanyards, failure of the cargo cable between the helicopter and the spreader bar, failure of the spreader bar, and the like, will not automatically release the other end of the spreader bar and the second helicopter will be thrown into the aforementioned perilous condition. Further, if a failure has occurred in the manual lanyard of the second cargo hook of Huested when any of the aforementioned casualties occur, the second cargo hook cannot be released, unless other and redundant means are provided.

Further, in a cargo system which utilizes a spreader bar supported from two helicopters by cables having cargo hooks attached thereto, it has been proposed that the mechanical release levers of the cargo hooks be interconnected by a light duty control cable which is routed axially through the spreader bar. A lanyard is then connected between this cable and the load itself. Thus, upon release of one cargo hook or upon failure of either of the cables which run from the load to the ends of the spreader bar, tension will be applied to the aforementioned control cable, thereby actuating the appropriate mechanical lever(s) and causing release of the spreader bar from both helicopters. The disadvantage of this system is that failure of either aircraft hoist cable or the spreader bar would result in no "release signal" being transmitted to the second aircraft cargo hook and, upon release o f the first cargo hook, the load would be "hung-up" on the second cargo hook and suspended perilously from the second aircraft. A second disadvantage of this system is that the lengths of the lanyard and the control wire present substantial problems in rigging the device. Thirdly, the lanyard is always susceptible to snagging on lift-off and could therefore lead to premature release of the cargo. Fourth, with this system, allowances would have to be made for structural and/or thermal deflections of the load assembly relative to the release assembly. Fifth, the requirement of attaching the control wires to the hook release mechanism is an extra hook-up operation.

The prior art includes many cargo hook release means, such as the manually operated lanyard release of Campbell U.S. Pat. No. 3,081,121, and the load touch down responsive release mechanisms of Bend1 Pat. No. 3,218,100 and Elsner U.S. Pat. No. 3,101,213, however, none of these patents teaches apparatus to automatically release the cargo hooks on the opposite ends of a spreader bar, in response to rotation of the spreader bar about its transverse axis at the appropriate end thereof. Beckwith U.S. Pat. No. 3,393,001 does teach cargo release means which is responsive to relative rotation between its suspension link (48) and its clamping slide (35). However, the release means disclosed in Beckwith could not be adapted for use in connection with the spreader bar of the instant invention since Beckwith requires that at least two cables be attached to the suspension link in order to provide the unbalanced force required for actuation of the release mechanism. Thus, although the Beckwith device could be utilized to provide release of the cargo upon failure of one of the load cables, it could not be utilized to provide release of the spreader bar from either or both of the helicopters.

SUMMARY OF THE INVENTION

It is therefore a primary object of the present invention to provide an automatic cargo release mechanism responsive to spreader bar rotation in a twin-lift aircraft-spreader bar cargo carrying system, such that in the event of hoist cable failure of either aircraft hoist, conventional cargo hook release mechanism failure, spreader bar failure, or load cable failure, the cargo hook of the aircraft which would otherwise receive the entire load is automatically released in response to spreader bar rotation thereabout beyond the preselected limit, to thereby jettison the load.

In accordance with the present invention, the cargo hook is automatically released by mechanical means, after the spreader bar has rotated beyond a predetermined limit about a transverse axis at one of its ends. This mechanism permits the required angular motion of the spreader bar brought about by hoist cable coning, during normal load carrying operation, and produces automatic release of the cargo hook only after the spreader bar rotates beyond this normal rotational limit.

It is a further feature of the present invention that in a twin helicopter hoist-spreader bar cargo suspension system, the load is automatically released from the helicopters in the event of a malfunction of the conventional normal release mechanism or in the event of failure of any part of the cargo suspension system.

In accordance with the present invention, the spreader bar is provided with striker members at opposite ends thereof which are positioned and oriented to trip a cam member and thereby release the cargo hook connected to the ends of the spreader bar when the spreader bar pivots about a transverse axis at that end thereof beyond a predetermined limit, thereby actuating the cargo hook release mechanism to jettison that end of the spreader bar from the cargo hook.

In addition, my release system also works when the spreader bar is not supporting a load.

BRIEF DESCRIPTION OF THE DRAWINGS

FIG. 1 is a schematic representation of a twin-lift helicopter-spreader bar cargo suspension system illustrating the environment and location of the novel release mechanism of this invention.

FIG. 2 is a side view of the spreader bar end, automatic release mechanism of this invention.

FIG. 3 is a showing of this release mechanism, partially in cross-section, along line 3—3 of FIG. 2.

DESCRIPTION OF THE PREFERRED EMBODIMENT

Referring to FIG. 1 we see twin-lift helicopter-spreader bar cargo suspension system 10, which consists of spreader bar 12 connected at its opposite ends through releasable aircraft cargo hooks 14 and 16 and aircraft hoist cables 18 and 20 to conventional aircraft 22 and 24 which are preferably helicopters of the type fully disclosed in U.S. Pat. No. Des. 193,492. Aircraft hoist cables 18 and 20 are connected to conventional hoist systems, such as a hoist drum in the aircraft, so that the length of the cables 18 and 20 and hence the position of spreader bar 12 with respect to aircraft 22 and 24 can be controlled from the aircraft. Load cables 26 and 28 are suspended from the opposite ends of spreader bar 12 and converge toward one another to connect to load 30 in some conventional fashion, such as through conventional cargo hook 32. Spreader bar 12 could be connected to load 30 in any conventional fashion. It will be seen by viewing FIG. 1 that aircraft 22 and 24, through spreader bar 12, mutually support load 30, so that suspension system 10 is capable of carrying a larger load than could a single helicopter of comparable size. Cables 18 and 20 could be fixed to the aircraft.

Viewing FIGS. 2 and 3, we see the automatic release mechanism in greater particularity. Spreader bar 12 has longitudinal axis 40, which is preferably the beam neutral axis, and also has transverse axis 42 extending perpendicular thereto at the end of spreader bar 12 shown in FIGS. 2 and 3. It should be noted that the opposite end of spreader bar 12 has a similar cargo and aircraft attachment mechanism which are preferably identical to that shown in FIGS. 2 and 3, and possibly allochiral thereto. Load cable 28 is pivotally connected to spreader bar 12 about pivot axis 44 by means of yoke member 46 which is connected to the cable end and has connecting pin 48 extending through aligned holes 50 and 52 in the flanges thereof. Pin 48 is held in position by a conventional cotter pin 54 and extends through aperture 56 of spreader bar 12 so as to pivotally connect load cable 28 to the end of spreader bar 12. Anti-chafing or spacer washers 58 and 60 are preferably utilized between yoke 46 and spreader bar 12 as shown in FIGS. 2 and 3. The illustrated end of spreader bar 12 is connected to aircraft 24 through aircraft hoist cable 20, which is connected at its lower end to releasable aircraft cargo hook assembly 16, which may be of the type shown in U.S. Pat. No. 3,068,034 and which preferably includes conventional manual lanyard or cable release mechanisms, electrical solenoid release mechanism, and a manually operated lever actuated release mechanism modified to provide the automatic release mechanism taught herein. Aircraft cargo hook 16 consists of body portion 64 which has load beam 66 pivotally connected thereto so as to be pivotable about pivot axis 68 between the closed or operable position shown in FIG. 2 and an open or inoperable position in which the load beam 66 pivots in clockwise motion with respect to pivot axis 68, thereby releasing the load. It will be noted by viewing FIG. 2 that with load beam 66 in the closed or operable position, enclosed aperture 70 is formed between cargo hook body member 64 and the load beam member 66. Link or attachment shackle 72, which preferably includes parallel plate members 74 and 76 with connecting bolts 78 and 80 and spacers 79 and 81 at the opposite ends thereof, it pivotally received at one to its ends by the passing of pivot bole 80 through aperture 82 in spreader bar 12 to the spreader bar and it is connected to the cargo hook assembly 16 at its opposite end by the passage of spacer 79, which is shaped to prevent rotation of link 72 with respect to load beam 66, through aperture 70, as illustrated in FIG. 2. For proper operation, load beam 66 must be closely received between plate members 74 and 76. Accordingly, link or attachment shackle 72 serves to connect one end of spreader bar 12 to aircraft cargo hook 16. Link 72 is preferably fabricated to include aperture extension 86 in spaced plate members 74 and 76 thereof so that, prior to pickup, hoist links 72 may be pivoted to the phantom position shown in FIG. 2 and a shear pin passed through lined apertures in spaced plates 74 and 76 and in spreader bar 12 so as to positively connect link 72 to the spreader bar 12, thus preventing premature release of the cargo which might be caused by large angular displacements between the cargo hook 16 and the spreader bar 12 prior to complete lift-off of the spreader bar. At lift-off the shear pin will shear to put hoist mechanism 10 into the operable condition shown in solid lines in FIG. 2.

Striker member 90 is spaced from and connected to spreader bar 12 by spacer mechanism 92 and nut and bolt members 94 and carries roller member 96 at its outer end. Striker 90 and roller 96 are positioned and oriented to be in alignment with camming surface 98 of cam member 100 which extends from and is pivotally connected to aircraft cargo hook 16 through shaft 102. Accordingly, as spreader bar 12 pivots about transverse axis 42 during normal cargo carrying operation, striker 90 pivots therewith both toward and away from camming surface 98. A certain amount of this pivot motion of the spreader bar 12 is necessary during normal flight operation to permit coning of the cables relative to spreader bar 18 and 20, and therefore, striker 90 is oriented so as not to contact camming surface 98 until this preselected angular rotation or pivot motion of spreader bar 12 about axis 42 has been completed.

Striker 90 is accordingly oriented angularly with respect to spreader bar 12 so that the roller 96 does not contact camming surface 98, or cam member 100 does not pivot sufficiently as a result thereof to release or unlock aircraft cargo hook 62, until the angular pivotal motion of the spreader bar 12 about transverse axis 42 exceeds this predetermined limit required for normal operation. When this predetermined pivot motion is exceeded pivotal cam member 100 is caused by contact with roller 96 of striker 90 to pivot along with shaft 102 and link 104, causing scissors 106 to open, pivoting link 108 about pivot axis 110 and causing recessed portion 112 of link 108 to move away from projecting portion 114 of load beam 66 thereby releasing load beam 66 to rotate about pivot axis 68, so as to thereby release link 72, spreader bar 12, cable 28 and load 30 form aircraft cargo hook 16, cable 20 and aircraft 24. This automatic, spreader bar rotational responsive, mechanical release mechanism just described in connection with FIGS. 2 and 3 with relation to cargo hook 16 from cargo helicopter 24 serves to release one end of spreader bar 22 in precisely the same fashion that similar mechanism attached to the opposite end of the spreader bar will release the opposite end of the spreader bar under similar conditions but due to opposite rotation of the spreader bar.

While the amount of spreader bar rotation about axis 42 will vary for various twin-lift-spreader bar cargo suspension system operations, it has been found for my particular operation that a permitted normal rotation of about 45° is desirable. Rotation therebeyond will cause releasing of the appropriate end of the spreader bar 12 by the coaction of striker 90 and pivot camming member 100.

It will be noted by viewing FIG. 2 that it is a counterclockwise rotation of spreader bar 12 and striker 90 which will cause automatic release of the illustrated right end of spreader bar 12. It will be realized that it will be clockwise rotation of the spreader bar which will so release the opposite end of the spreader bar.

The advantage to be gained by this construction can best be illustrated by a few practical examples. If the left hand (unshown) aircraft cargo hook 14 is released or opened by normal electrical means, such as a solenoid, and the shown right hand hook 16 malfunctions, then the spreader bar 12 will rotate about axis 42 of FIG. 2 in a counterclockwise direction to automatically release the spreader bar from the cargo hook 16.

A similar result will be obtained if left hand hoist cable 18 breaks or is intentionally severed by a conventional guillotine mechanism (not (shown). Further, a crippling failure of spreader bar 12 will cause it to sag in the middle, due to its own weight, and this sagging motion will cause the ends of the spreader bar to rotate in the proper direction to effect automatic release of both ends of the bar 12 by the mechanism shown and described in connection with FIGS. 2 and 3. Still further, failure of either load cable 26 and 28 will cause the full load 30 to be transmitted to one helicopter thereby causing that helicopter to drop or lose altitude and hence cause the beam or spreader bar 12 to release automatically this mechanism from the unloaded aircraft and the beam will then reverse the direction of rotation and will release as described above from the loaded aircraft.

I wish it to be understood that I do not desire to be limited to the exact details of construction shown and described, for obvious modifications will occur to a person skilled in the art.

What is claimed is:

1. Automatically releasable cargo handling mechanism including:
   A. a spreader bar having a longitudinal axis and having a transverse axis at each of its ends and adapted to be connected to the load and the load carrying mechanism at each of its ends,
   B. a cargo hook connected to one end of said spreader bar and adapted to be connected to said load carrying mechanism and including:
      1. means to release said cargo hook,
   C. striker means connected to said spreader bar for rotation therewith about one of said transverse axes and oriented with respect to said spreader bar to permit limited rotational movement of said spreader bar about said transverse axis and so that when said rotation of said spreader bar about said transverse axis exceeds a predetermined limit, said striker member actuates said hook release means to release said spreader bar from said cargo hook.

2. Apparatus according to claim 1 wherein said hook release means is rotationally responsive.

3. Apparatus according to claim 2 wherein said hook release means includes a cam member pivotally connected to said rotationally responsive hook release means and wherein said striker member is positioned to contact and rotate said cam member when said spreader bar exceeds its predetermined angular rotation about said transverse axis.

4. Apparatus according to claim 3 wherein said cargo hook includes a body member and a load beam member and further including a link member pivotally connected to said spreader bar at one of its ends and connected to said cargo hook at its other end.

5. Apparatus according to claim 4 and including means to fixedly connect said link member to said spreader bar.

6. Apparatus according to claim 5 wherein said connecting means is frangible and releasable in response to spreader bar loading through said cargo hook.

7. Cargo handling equipment adapted to support a load from beneath one or more aircraft including:
   A. a spreader bar having a longitudinal axis and having a transverse axis at each of its ends,
   B. means for connecting the opposite ends of said spreader bar to a load,
   C. means for connecting the opposite ends of the spreader bar to one or more aircraft and including:

1. a cargo hook connected to one end of said spreader bar and actuatable between a closed, operable position and an open, inoperable position,
2. means to actuate said cargo hook from said closed to said open position,
3. striker means connected to one end of said spreader bar and positioned to rotate therewith about said transverse axis and oriented to permit limited rotation of said spreader bar about said transverse axis up to a predetermined rotational limit and to contact and actuate said actuating means when spreader bar rotation reaches said predetermined limit to open said hook and release said spreader bar end.

8. Apparatus according to claim 7 wherein said hook actuation means is rotationally responsive.

9. Apparatus according to claim 8 wherein said hook actuation means includes a cam member pivotally connected to said rotationally responsive hook actuation mechanism and wherein said striker member is positioned to contact and rotate said cam member when said spreader bar exceeds its predetermined angular rotation about said transverse axis.

10. Apparatus according to claim 9 wherein said cargo hook includes a body member and a load beam member and further including a link member pivotally connected to said spreader bar at one of its ends and connected to said cargo hook at its other end.

11. Cargo handling equipment including a spreader bar having a longitudinal axis and having a transverse axis at its opposite ends and adapted to have its opposite ends connected to a load and to a load carrying mechanism and including:
   A. a releasable cargo hook connecting one end of the spreader bar to the load carrying mechanism,
   B. and means responsive to rotation of the spreader bar about the transverse axis at one of its ends to release said cargo hook when the rotation of the spreader bar about said transverse axis exceeds a predetermined limit.

12. Apparatus according to claim 11 including:
   A. a releasable cargo hook connecting each end of the spreader bar to the load carrying mechanism, and means responsive to rotation of the spreader bar in a clockwise direction about the spreader bar transverse axis at the first of its ends to release one of the cargo hooks when the rotation of the spreader bar about said transverse axis exceeds a predetermined limit and further responsive to counterclockwise rotation of the spreader bar about the transverse axis at the other end of the spreader bar to release the other cargo hook when the rotation of the spreader bar about said other transverse axis exceeds a predetermined limit.

13. Automatically jettisonable cargo handling equipment including:
   A. a load stabilizer boom having a longitudinal axis and also having transverse axes at its opposite ends,
   B. means to connect the opposite ends of said cargo boom to a load,
   C. means to connect opposite ends of said cargo boom to one or more aircraft and including:
      1. a releasable cargo hook connected to one end of said boom,
   D. means responsive to rotation rotation of said cargo boom about one of said transverse axes to release said cargo hook and jettison that end of the boom.

14. Apparatus according to claim 13 wherein said last means is responsive to clockwise rotation of said boom about the transverse axis at one end of the boom to release the cargo hook at that end of the boom and is responsive to counterrotational rotation of the boom about the transverse axis at the other end of the boom to release the cargo hook at the other end of the boom 15. Cargo handling equipment including:
   A. a spreader bar having a longitudinal axis and having a transverse axis at its opposite ends,
   B. means for connecting said spreader bar to a load,
   C. means for connecting each end of said spreader bar to at least one load carrying mechanism and including:
      1. a releasable connecting mechanism,
      2. and means responsive to rotation of the spreader bar about the transverse axis at one of its ends to release said connecting mechanism when the rotation of the spreader bar about said transverse axis exceeds a predetermined limit.

16. Automatically releasable cargo handling mechanism including:
   A. a spreader bar having a longitudinal axis and a transverse axis at each of its ends,
   B. means for connecting the opposite ends of said spreader bar to a load including:
      1. a yoke member pivotally connected to each end of said spreader bar,
      2. a connecting member adapted to connect to a load, and
      3. converging cable members extending between said yoke members and said connecting member,
   C. means for connecting the opposite ends of said spreader bar to separate load carrying mechanisms including:
      1. a releasable cargo hook actuatable between a closed and an open position and including:
         a. rotationally responsive means to release said cargo hook,
   D. a link member pivotally connected to the end of said spreader bar at one of its ends and connected to said cargo hook at its other end when said cargo hook is in said closed position,
   E. a striker bar connected to each end of said spreader bar for rotation therewith about said transverse axes and oriented with respect to said spreader bar to permit limited rotational movement of said spreader bar about said transverse axes and so that when said rotation of said spreader bar about said transverse axes exceeds a predetermined limit said striker bar actuates said hook release means to release said spreader bar from said cargo hook.

* * * * *